United States Patent
Wright

[15] 3,671,429

[45] June 20, 1972

[54] GREASE-LIKE SILICONE COMPOUND

[72] Inventor: John H. Wright, Elnora, N.Y.

[73] Assignee: General Electric Company

[22] Filed: Sept. 25, 1969

[21] Appl. No.: 861,180

[52] U.S. Cl. .................................................. 252/25, 252/49.6
[51] Int. Cl. ................................... C10m 7/50, C10m 7/28
[58] Field of Search .................................. 252/25, 58, 49.6

[56] References Cited

UNITED STATES PATENTS

| | | | |
|---|---|---|---|
| 3,314,889 | 4/1967 | Christian | 252/58 |
| 3,453,210 | 7/1969 | Wright | 252/28 |

FOREIGN PATENTS OR APPLICATIONS 683,969  12/1952  Great Britain...........................252/25

*Primary Examiner*—Daniel E. Wyman
*Assistant Examiner*—I. Vaughn
*Attorney*—Donavon L. Favre, Frank L. Neuhauser, Oscar B. Waddell and Joseph B. Forman

[57] ABSTRACT

Grease-like compositions consisting of (1) 100 parts of a liquid organopolysiloxane having a viscosity of from 50 to 200,000 centistokes at 25° C., (2) from 17 to 300 parts of finely divided zinc oxide, and (3) from about 17 to 300 parts of finely divided polytetrafluoroethylene. The material is useful, particularly, in electrical switch gear.

5 Claims, No Drawings

GREASE-LIKE SILICONE COMPOUND

CROSS-REFERENCES TO RELATED APPLICATIONS

My previously issued U.S. Pat. No. 3,453,210, assigned to the same assignee as the present invention, is also related to grease-like silicone compounds which contain polytetrafluoroethylene. However, the composition of that patent differs from the present composition in that silica is combined with the polytetrafluoroethylene, rather than the zinc oxide of the present invention.

BACKGROUND OF THE INVENTION

A large number of grease-like silicone compositions are described in the prior art. The prior art has also described grease-like silicone compositions which contain polytetrafluoroethulene as one of the additive materials. However, in certain applications, it is required that the grease-like composition provide, not only, the lubricity which would be expected of a grease, but, additionally, heat transfer properties. In the absence of such properties, not only does the grease-like silicone composition break down, but, additionally, there can be severe wear of certain of the articles for which the lubricity is to be provided, with a resulting breakdown of those articles.

Various compositions have been employed in such uses, where heat transmittal is required, and though the grease-like composition may function adequately in other circumstances, it either breaks down under the particular conditions experienced, does not adequately protect against excessive wear of the device being lubricated, or both.

SUMMARY OF THE INVENTION

In accordance with the present invention, it has unexpectedly been discovered that there is a synergistic effect between finely divided polytetrafluoroethylene and finely divided zinc oxide, when the two are employed as fillers in a silicone fluid to form a grease-like silicone composition. The grease-like silicone composition of the present invention is formed of 100 parts of a liquid organopolysiloxane having a viscosity of from 50 to 200,000 centistokes at 25° C., from about 17 to 300 parts of zinc oxide, and from about 17 to 300 parts of finely divided polytetrafluoroethylene. Preferably, on the basis of 100 parts of the afore-referenced silicone fluid, the composition contains from 60 to 167 parts of finely divided zinc oxide and from 20 to 100 parts of finely divided polytetrafluoroethylene. Of course, the composition can also contain various stabilizing agents, if desired.

That the combination of polytetrafluoroethylene and zinc oxide with a silicone fluid should give a silicone composition with grease-like properties is particularly surprising. Zinc oxide is not a thickening type of filler and, in fact, as much as 65 to 75 parts of zinc oxide mixed with the silicone fluid, provides a composition which is still soupy and without grease-like properties. A composition which might be defined as grease-like, but without stability, may exist with a zinc oxide content of at least 200 to 250 parts per 100 parts of the silicone fluid. A grease-like composition is one which is deformable, and readily sheared, but which, on removal of external forces, remains dimensionally stable.

Similarly, when finely divided polytetrafluoroethylene is mixed with a silicone fluid, no grease is formed when as much as 50 parts of finely divided polytetrafluoroethulene is mixed with 100 parts, by weight, of silicone fluid. Rather, this composition is a liquid with a dispersed solid. When additional quantities of polytetrafluoroethylene are added, i.e., about 100 parts of polytetrafluoroethylene for each 100 parts, by weight, of the silicone fluid, the material becomes more solid, or rubber-like, and still does not attain a grease-like consistency and state.

Unexpectedly, when zinc oxide and polytetrafluoroethylene are used, together, to form the grease-like silicone composition of the present invention, not only is the grease-like composition formed, but additionally the composition has excellent lubricating properties, a penetration in a desirable range, and a high heat conductivity. This combination of properties makes it imminently suitable as a grease for electrical switch gear.

When similar greases, employing silica as the thickening agent, are employed in the same situations, there is too much bleed and, additionally, the abrasive action of the silica may wear away moving parts, such as hinges, to give undesirable electrical flashovers.

It is thus an object of the present invention to provide a silicone composition formed of a silicone fluid, finely divided zinc oxide, and finely divided polytetrafluoroethylene.

DESCRIPTION OF THE PREFERRED EMBODIMENTS

The composition of the present invention is a grease-like silicone composition, formed of 100 parts of a silicone fluid, from about 17 to 300 parts of finely divided zinc oxide, and about 17 to 300 parts of polytetrafluoroethylene. Preferably, there are from about 60 to 167 parts of zinc oxide and from 20 to 100 parts of polytetrafluoroethylene.

The liquid organopolysiloxane which is employed has a viscosity of from about 50 to 200,000 centistokes at 25° C. and has the average formula:

(1)  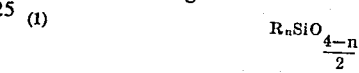

$$R_n SiO_{\frac{4-n}{2}}$$

where R is a member selected from the class consisting of monovalent hydrocarbon radicals, halogenated monovalent hydrocarbon radicals, and cyanoalkyl radicals and n has a value of from about 2.001 to 2.005.

The organopolysiloxane fluids employed in the compositions of the present invention are known in the art and comprise a wide variety of organopolysiloxanes in which the R group of Formula (1) can represent many different radicals. Illustrative of the groups represented by R of Formula (1) are alkyl radicals, e.g., methyl, ethyl, propyl, octyl, butyl, octadecyl, etc. radicals; aryl radicals, e.g., phenyl, tolyl, xylyl, naphthyl, etc. radicals; aralkyl radicals, e.g., benzyl, phenethyl, etc. radicals; alkenyl radicals, e.g., vinyl, allyl, etc. radicals; cycloaliphatic hydrocarbon radicals, e.g., cyclohexyl, cycloheptyl, cyclohexenyl, etc. radicals; halogenated monovalent hydrocarbon radicals, e.g., chloromethyl, dibromophenyl, perfluoromethylphenyl, perfluoromethylethyl, gamma-chloropropyl, gamma-bromophenyl, gamma-iodopropyl, etc. radicals; cyanoalkyl radicals, e.g., cyanomethyl, alpha-cyanomethyl, beta-cyanomethyl, beta-cyanopropyl, gamma-cyanopropyl, omega-cyanobutyl, etc. radicals. Regardless of the nature of the organopolysiloxane it is preferred that at least 50 percent of the radicals represented by R be methyl radicals.

In defining the organopolysiloxane fluid of Formula (1) it has been stated that the viscosity of the fluid is in the range of from 50 centistokes to 200,000 centistokes at 25° C. and that there are present from 2.001 to 2.005 silicon-bonded R groups per silicon atom. This variation in viscosity and R groups is, of course, common in the silicone fluid art and it is known that the higher the ratio of R groups to silicon atoms, the shorter will be the molecule and the lower will be the viscosity. Conversely, the lower within the range described above, the number of R groups per silicon atom, the higher will be the molecular weight and the viscosity.

While the average formula for the liquid organopolysiloxane has been described as above, it should be observed that this liquid organopolysiloxane consists of various siloxane units. The predominant siloxane unit in these materials is a diorganosiloxane unit of the formula $R_2SiO$, but the organopolysiloxanes must also contain some triorganosiloxane units of the formula $R_3SiO_{0.5}$ in order to reach the proportions required by Formula (1). These organopolysiloxanes can also consist of both triorganosiloxane units of the type described above and monoorganosiloxane units having the formula $RSiO_{1.5}$, so long as the ratios of the various units comprising the organopolysiloxane liquid are such as to provide the average composition of Formula (1). The various siloxane units, even though all are diorganosiloxane units, need not be the same. For example, the organopolysiloxane can comprise dimethylsiloxane units and methylphenylsiloxane units, or dimethylsiloxane units and diphenylsiloxane units, or methylphenylsiloxane units and methyl-beta-cyanoethylsiloxane units. The selection of the particular siloxane units is within the skill of those in the art.

Sometimes the particular organic group of the organopolysiloxane can affect the overall characteristics of the final product. For example, one of the characteristics often desired in an organopolysiloxane material is solvent resistance. Solvent resistance of the organopolysiloxane can be enhanced by employing polar groups for the organic radicals. In fact, one of the compositions useful in the present invention employs a liquid organopolysiloxane which consists of a trimethylsilyl chain-stopped methyl-beta-cyanoethyl siloxane. This composition will provide the heat transfer characteristics and stability of the present invention, while exhibiting improved resistance to the effect of hydrocarbon solvents.

While the organopolysiloxane fluid has been described with reference to being a single type of material, it is very often desirable and forms one embodiment of the present invention, to use a blend of different organopolysiloxane fluids. The use of blends is desirable to those instances in which it is desirable that the shear ratio of the composition be maintained as steady as possible over a very broad temperature range, e.g., a range of from about −65° F. to 400° F. The shear ratio is the ratio of the apparent viscosity of the composition under shear to the actual viscosity. It is found that compositions having these desirable shear ratios can be obtained employing as the organopolysiloxane liquids a blend of a high viscosity organopolysiloxane and a low viscosity organopolysiloxane. The high viscosity organopolysiloxane is generally polydiorganopolysiloxane (which can be trimethylsilyl chain-stopped) having a viscosity in excess of about 100,000 centistokes at 25° C., where the organic groups are within the scope of the groups defined for R of Formula (1). The low viscosity material is generally a fluid having a viscosity of from about 20 to 1,000 centistokes and can comprise a conventional organopolysiloxane within the scope of Formula (1) in which the organic groups are of the same type as described with respect to the fluid of Formula (1).

The proportions of the two silicone fluids are selected so that the blend viscosity is within the range of from about 50 centistokes to 200,000 centistokes at 25° C. The blend viscosity of a mixture of organopolysiloxanes is well known in the art and is defined by the following formula:

(2) $\log n_B = X_1 \log n_1 + X_2 \log n_2$, where $\log n_B$ is equal to the log of the viscosity of the blend, $X_1$ is the fraction of the first silicone fluid in the blend, $\log n_1$ is the log of the viscosity of the first silicone fluid in the blend, $X_2$ is the fraction of the second silicone fluid in the blend, and $\log n_2$ is the log of the viscosity of the second silicone fluid. Employing Formula (2), the two silicone fluids are selected so as to provide the desired viscosity in the fluid blend.

The zinc oxide which is employed in the composition of the present invention can be any of a variety of finely divided zinc oxides. For example, the zinc oxide can be the one defined as USP No. 12 with a mean particle size of 0.3 micron, and a surface area of 3.5 square meters per gram. The particle size of the zinc oxide employed in the present composition can vary from about 0.05 to 10 microns. The zinc oxide is employed, as described, for the purpose of dissipating heat, particularly the heat generated from the flow of current through electrical switch gear.

While other materials could be employed to dissipate the heat, each provides a particular disadvantage. For example, aluminum oxide would be difficult to use because of its abrasive nature; beryllium oxide because of its toxicity; boron nitride because of its high cost. Additionally, none of these materials provide the same synergistic effect in grease formation, when used in combination with polytetrafluoroethylene, as does the zinc oxide.

The finely divided polytetrafluoroethylene employed in the practice of the present invention is a material well known in the art and is readily available under the trade name Teflon from E. I. duPont Nemours & Company of Wilmington, Delaware, under the trade name Rilube No. 63 from the Modern Industrial Plastics Division of the Duriron Company, Dayton, Ohio, and under the trade name TL 126 from the Liquid Nitrogen Processing Corporation, Malvern, Pennsylvania. It is desirable that the polytetrafluoroethylene be employed as a fine powder, for example, as a powder of particles having an average particle size of from about 1 to 50 microns, but including some particles having diameters as low as 0.1 to as high as 100 microns, or more, in diameter.

In preparing the compositions of the present invention, the liquid organopolysiloxane of Formula (1) is merely mixed with the finely divided zinc oxide and with the finely divided polytetrafluoroethylene in any suitable fashion. The most convenient method for preparing the mixture is in a grease mill, which is any apparatus which subjects the mixture to a shearing action. A typical apparatus to provide such shearing action is a conventional 3-roll paint mill and the components are mixed on such a 3-roll paint mill until thoroughly blended. After the materials are thoroughly blended, the products of this invention are ready for use. The blending can take place at any temperature with no apparent reason being observed for blending the materials at any temperature other than room temperature. Where the liquid organopolysiloxane of Formula (1) is actually a mixture of materials, the mixture is first prepared and then mixed with the other components of the grease-like composition for easiest preparation. However, even in the case where two different fluids are employed, it is not essential that the fluids be premixed before blending with the finely divided zinc oxide and the finely divided polytetrafluoroethylene.

In addition to the liquid organopolysiloxane, the finely divided zinc oxide, and the polytetrafluoroethylene which are the essential components of the grease-like compositions of the present invention, it is sometimes desirable to modify these compositions by the incorporation of various well known stabilizing agents to further improve the mechanical stability of such compositions. One of the most useful classes of stabilizers is the polyalkylene glycols and the monoalkyl ethers of such polyalkylene glycols. These polyalkylene glycol materials can be described, generically, by the formula:

(3) $R'O(C_aH_{2a}O)_x(C_bH_{2b}O)_yH$,

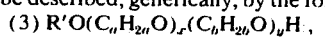

where R' is a member selected from the class consisting of hydrogen and lower alkyl radicals containing from one to seven carbon atoms, $a$ and $b$ are integers equal to from 1 to 4, inclusive, $x$ is an integer equal to from about 4 to 50, or more, and preferably from 5 to 20, inclusive, and $y$ is a whole number equal to from about 0 to about 50. These compounds can be prepared, for example, by forming polyalkylene glycols of ethylene glycol, propylene glycol, or butylene glycol. These polyalkylene glycols are interacted with a monohydric saturated aliphatic alcohol containing from one to seven carbon atoms to form the monoether. A composition containing two different alkylene oxide groups can be prepared, for example, by reacting a polypropylene glycol with ethylene oxide in the presence of boron trifluoride. The mixed polyalkylene glycol, if desired, can then be reacted with an alkanol, such as butanol, to form the monobutoxy ether of the mixed polyalkylene glycol. A number of these polyalkylene oxide materials are commercially available, including the materials sold under the trade name Ucon by Union Carbide Corporation and the materials sold under the name Pluracol by the Wyandotte Chemicals Corporation. When these stabilizers are added to the compositions of the present invention, they are present in an amount up to about 3 parts by weight per 100 parts by weight of the liquid organopolysiloxane.

An additional type of stabilizer useful in the compositions of the present invention are the boron compounds described and claimed in my U.S. Pat. No. 3,103,491, issued Sept. 10, 1963, and assigned to the same assignee as the present invention. These boron compounds are members selected from the class consisting of boric acid, trimethoxyboroxine and trialkyl borates in which the alkyl radicals contain from one to five carbon atoms. These boron compounds are added in an amount sufficient to provide from 0.001 part by weight to 1.0 part by weight boron per 100 parts by weight of the silicone fluid. As described in my aforementioned patent, in addition to the boron compounds, pentaerythritol can be added in combination with the boron compounds to further stabilize the grease compositions. When pentaerythritol is added in combination with the boron compound, the pentaerythritol is employed in an amount up to about 5 parts by weight, and preferably from 0.25 to 4.0 parts by weight per part of the boron compound.

Where any of the stabilizers described above are added to the compositions of the present invention, the additives are merely mixed with the silicone oil, the finely divided zinc oxide, and the finely divided polytetrafluoro-ethylene, either prior to or during the blending of these components into a grease-like or putty-like composition.

The following examples are illustrative of my invention and are not intended for purposes of limitation. All parts are by weight.

EXAMPLE 1

A grease-like composition was formed from 40 parts of a dimethylpolysiloxane fluid having a viscosity, at 25° C. of 100 centistokes, 40 parts of finely divided zinc oxide (USP No. 12) with a mean particle diameter of 0.3 micron, and 20 parts of a finely divided polytetrafluoroethylene powder. The polytetrafluoroethylene was a commercial powder having an average particle size of about 10 microns. The grease-like composition was formed by mixing the three components in a grease kettle and then milling for a sufficient time to complete blending on a three-roll mill.

After formation of the grease-like composition, its properties were examined. The grease had a worked penetration at 60 cycles of 286, 0.9 percent evaporation at 200° C. for 24 hours, and a bleed of 1.0 percent for 24 hours at 200° C. The grease-like composition formed was employed on a breaker switch operating at 180° C. After use for several hundred hours, the grease-like composition showed no evidence of hardening, separation, loss of dielectric properties, loss of lubricity, or adhesion.

Similar greases, but formed with additives other than the combination of zinc oxide and polytetrafluoroethylene were tried in the same application. The materials included a similar organopolysiloxane fluid blended only with zinc oxide, a similar organopolysiloxane fluid blended only with polytetrafluoroethylene, and a similar organopolysiloxane fluid blended with both silica and polytetrafluoroethylene. In each case, there was a failure of at least one of the properties referenced above.

EXAMPLE 2

Various grease-like silicone compositions were prepared employing varying amounts of zinc oxide and polytetrafluoroethylene in order to show the synergistic effect of the two materials combined with the organopolysiloxane fluid. The fluid, zinc oxide, and polytetrafluoroethylene in each of the following compositions was of the same type as employed in the grease-like composition of Example 1, but with the amounts as shown in Table I below.

TABLE I

| Material | 1 | 2 | 3 | 4 | 5 | 6 | 7 |
|---|---|---|---|---|---|---|---|
| Polytetrafluoroethylene | 233 | 150 | — | — | 100 | 50 | 75 |
| Zinc Oxide | — | — | 233 | 150 | 50 | 100 | 75 |
| Organopolysiloxane Fluid | 100 | 100 | 100 | 100 | 100 | 100 | 100 |

It will be seen that each of compositions 5 through 7 in Table I are within the present invention, by virtue of the mixture of polytetrafluoroethylene and zinc oxide in combination with the organopolysiloxane fluid. Compositions 1 through 4 are outside the composition of the present invention by virtue of the fact that none of these contain both the polytetrafluoroethylene and zinc oxide. The worked penetration at 60 cycles was measured for each of the compositions prepared above with the following results:

TABLE II

| Run No. | Penetration |
|---|---|
| 1 | 114 |
| 2 | 220 |
| 3 | 280 |
| 4 | 311 |
| 5 | 193 |
| 6 | 241 |
| 7 | 196 |

When 150 parts of polytetrafluoroethylene were used in combination with 100 parts of organopolysiloxane fluid, as in run 2, a worked penetration of 220 was obtained; a similar amount of zinc oxide with the organopolysiloxane fluid gave a worked penetration of 311, as can be seen in run 4. However, when a total of 150 parts of a mixture of polytetrafluoroethylene and zinc oxide were employed, employing either 100 parts of polytetrafluoroethylene as in run 5, or 100 parts of zinc oxide as in run 6, different penetration values are obtained and these penetration values are not the average of the penetration values obtained using only one of the additives. Thus, with 100 parts of Teflon as in run 5, and 50 parts of zinc oxide, a worked penetration of 193 was obtained, while with 100 parts of zinc oxide and 50 parts of polytetrafluoroethylene, as in run 6, a worked penetration of 241 was obtained. Similarly, in run 7, a total of 150 parts of additives were employed, comprising 75 parts of polytetrafluoroethylene and 75 parts of zinc oxide. Again, the worked penetration could not be averaged, but gave a value of 196.

In a similar fashion, the thermal conductivities of the greases formed according to the present invention are not those which might be obtained by merely averaging the thermal conductivities of materials employing only one of the additives. The thermal conductivity of the material of run 2, employing 150 parts of polytetrafluoroethylene for each 100 parts of organopolysiloxane fluid was 0.04 BTU/ft.$^2$/°F./ft./sec., extremely low. As might be expected, the thermal conductivity of the composition formed according to run 4 was 0.195 BTU/ft.$^2$/°F./ft./sec. Of course, the penetration of 311 would be unacceptable. In run 6, 50 parts of polytetrafluoroethylene and 100 parts of zinc oxide were employed, along with 100 parts of organopolysiloxane fluid. Based upon the thermal conductivities for runs 2 and 4, a thermal conductivity of 0.11 would be expected. Rather, the thermal conductivity of the composition of run 6 was 0.147 BTU/ft.$^2$/°F./ft./sec.

Thus, not only do the two additives, in combination, provide a synergistic thermal conductivity, but additionally synergistically provide a grease-like composition.

The compositions of the present invention provide a grease-like composition having good thermal conductivity, low bleed or separation, good lubricity, excellent heat aging characteristics, and excellent dielectric properties.

While a number of embodiments of my invention have been illustrated in the foregoing examples, as well as comparative data for other compositions, it should be understood that my invention is directed broadly to the class of compositions previously described which are characterized by the presence of specific proportions of finely divided zinc oxide and finely divided polytetrafluoroethylene in many types of liquid organopolysiloxanes of the type described. Each of the compositions within the scope of the present invention is prepared in the same general manner by merely blending the compositions in a typical fashion to a grease-like composition.

What I claim as new and desire to secure by letters patent of the United States is:

1. An organopolysiloxane composition of grease-like consistency with improved thermal conductivity and stability having good lubricity and good internal lubrication consisting essentially of, by weight,
   1. 100 parts of a liquid organopolysiloxane having a viscosity of from 50 to 200,000 centistokes at 25° C., and having the average formula:

$$R_nSiO_{\frac{4-n}{2}}$$

where R is a member selected from the class consisting of monovalent hydrocarbon radicals, halogenated monovalent hydrocarbon radicals, and cyanoalkyl radicals, where n has a value of from 2.001 to 2.05;
   2. from about 17 to 300 parts of finely divided zinc oxide, and
   3. from about 17 to 300 parts of finely divided polytetrafluoroethylene.

2. The composition of claim 1 wherein the finely divided zinc oxide is employed in amounts of from 60 to 167 parts and the finely divided polytetrafluoroethylene is employed in amounts of from 20 to 100 parts.

3. The organopolysiloxane of claim 1 in which the finely divided polytetrafluoroethylene has an average particle size no greater than about 100 microns.

4. The organopolysiloxane composition of claim 1 in which R is methyl.

5. The organopolysiloxane composition of claim 1 in which the mean average particle size of the finely divided zinc oxide is approximately 0.3 micron.

* * * * *